(12) United States Patent
Saito et al.

(10) Patent No.: US 11,118,625 B2
(45) Date of Patent: Sep. 14, 2021

(54) MAGNETIC BEARING

(71) Applicant: NIDEC COPAL ELECTRONICS CORPORATION, Tokyo (JP)

(72) Inventors: Yusuke Saito, Sano (JP); Yuki Nakada, Sano (JP); Kyosuke Saso, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 26 days.

(21) Appl. No.: 16/594,547

(22) Filed: Oct. 7, 2019

(65) Prior Publication Data
US 2020/0032844 A1 Jan. 30, 2020

Related U.S. Application Data

(63) Continuation of application No. PCT/JP2018/004449, filed on Feb. 8, 2018.

(30) Foreign Application Priority Data

Apr. 28, 2017 (JP) .............................. JP2017-089452

(51) Int. Cl.
*F16C 32/04* (2006.01)
*H02K 5/16* (2006.01)
*H02K 7/09* (2006.01)

(52) U.S. Cl.
CPC ...... *F16C 32/0417* (2013.01); *F16C 32/0423* (2013.01); *F16C 32/0427* (2013.01); *H02K 5/16* (2013.01); *H02K 7/09* (2013.01)

(58) Field of Classification Search
CPC ...... H02K 7/085; H02K 7/14; H02K 2213/03;
H02K 7/09; F16C 23/043; F16C 23/045;
F16C 32/0406; F16C 32/0408; F16C
32/041; F16C 32/0412; F16C 32/0419;
F16C 32/0421; F16C 32/0423;
(Continued)

(56) References Cited

FOREIGN PATENT DOCUMENTS

| CN | 1651779 | 8/2005 |
|----|---------|--------|
| CN | 103470631 | 12/2013 |

(Continued)

OTHER PUBLICATIONS

International Search Report for International Application PCT/JP2018/004449, dated Apr. 3, 2018.
(Continued)

*Primary Examiner* — Ahmed Elnakib
(74) *Attorney, Agent, or Firm* — Burris Law, PLLC

(57) ABSTRACT

A magnetic bearing includes a ring-shaped first magnet, a ring-shaped second magnet, a first magnetic body and a second magnetic body. The ring-shaped first magnet is magnetized in an axial direction. The ring-shaped second magnet is concentrically arranged with the first magnet and is magnetized in the axial direction. The first magnetic body is provided on a first surface in the axial direction of the second magnet. The second magnetic body is provided on a second surface parallel to the first surface in the axial direction of the second magnet. A thickness of each of the first magnetic body and the second magnetic body is less than or equal to an acceptable fluctuation amount in the axial direction of the second magnet with respect to the first magnet and greater than or equal to 0.1 mm.

12 Claims, 7 Drawing Sheets

(58) Field of Classification Search
CPC .............. F16C 32/0429; F16C 32/0431; F16C 32/0436; F16C 32/0417
USPC ....................................................... 310/90.5
See application file for complete search history.

(56) References Cited

FOREIGN PATENT DOCUMENTS

| | | | |
|---|---|---|---|
| CN | 203722347 | | 7/2014 |
| CN | 106090010 | | 11/2016 |
| JP | S59155322 | | 10/1984 |
| JP | S62270824 | | 11/1987 |
| JP | H02157716 | | 6/1990 |
| JP | H04355639 | | 12/1992 |
| JP | H10225080 | * | 8/1998 |
| JP | H11311252 | * | 11/1999 |
| JP | H11344129 | | 12/1999 |
| JP | 2009192041 | | 8/2009 |
| TW | 521477 | | 2/2003 |

OTHER PUBLICATIONS

Office Action Issued in Corresponding CN Application No. 2018800201755, dated May 22, 2020.
Office Action issued in corresponding TW Application No. 107103614, dated Apr. 22, 2021.

* cited by examiner

100 # MAGNETIC BEARING

CROSS-REFERENCE TO RELATED APPLICATIONS

This application is a continuation of International Application No. PCT/JP2018/004449, filed on Feb. 8, 2018, which claims priority to and the benefit of Japanese Patent Application No. 2017-089452, filed on Apr. 28, 2017. The disclosures of the above applications are incorporated herein by reference.

FIELD

The present disclosure relates to a magnetic bearing applied to, for example, a motor which is integrated with a scanner or a fan.

BACKGROUND

For example, an aerodynamic bearing applied to a so-called fan motor in which a fan and a motor are integrated with each other comprises, for example, a magnetic bearing. The magnetic bearing suppresses, for example, fluctuation of a rotating shaft of the motor in a thrust direction (axial direction).

The magnetic bearing comprises, for example, ring-shaped two magnets, and suppresses the fluctuation of the rotating shaft in the thrust direction by the magnetic interaction, for example, the attraction force of these two magnets (see, for example, Patent Literature 1 (JP H11-344129 A)).

SUMMARY

In the above-described magnetic bearing, when a fluctuation amount in the thrust direction of the two magnets is large, necessary attraction force may be obtained by increasing the volume of each of the two magnets or using a material having strong magnetic force. In this case, however, it is difficult to miniaturize a product.

Also, necessary attraction force may be obtained by using a large number of yokes for the magnetic bearing. In that case, however, it is necessary to take a large number of assembling steps for matching the magnetic centers of the yokes. In addition, if the magnetic centers of the yokes are not matched, force in a radial direction (direction crossing the shaft) is increased, and for example, the life of the motor in which the magnetic bearing is provided will be shortened.

Embodiments of the present invention provide a magnetic bearing which can sufficiently suppress fluctuation in the thrust direction, can be easily assembled, and can be miniaturized.

According to one embodiment, a magnetic bearing comprises a ring-shaped first magnet magnetized in an axial direction, a ring-shaped second magnet arranged concentrically with the first magnet and magnetized in the axial direction, a first magnetic body provided on a first surface in the axial direction of the second magnet, and a second magnetic body provided on a second surface parallel to the first surface in the axial direction of the second magnet. A thickness of each of the first magnetic body and the second magnetic body is less than or equal to an acceptable fluctuation amount in the axial direction of the second magnet with respect to the first magnet and greater than or equal to 0.1 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
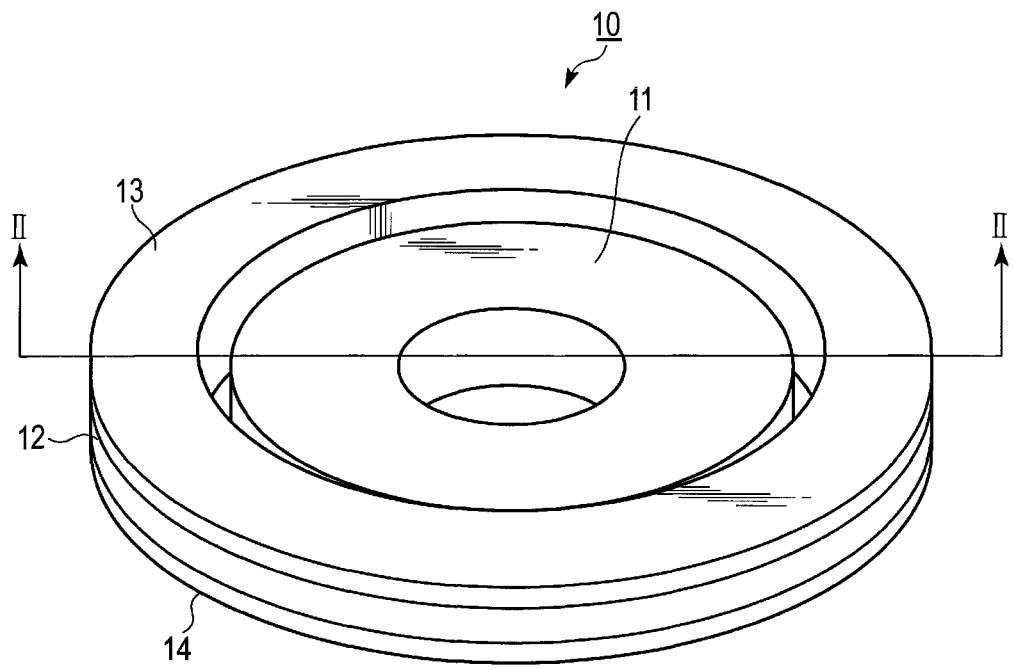
FIG. 1 is a perspective view showing an example of a magnetic bearing according to the first embodiment.

Embodiments will be described hereinafter with reference to the accompanying drawings. In the drawings, the same portions are denoted by the same reference numbers.

First Embodiment

Figure 2:
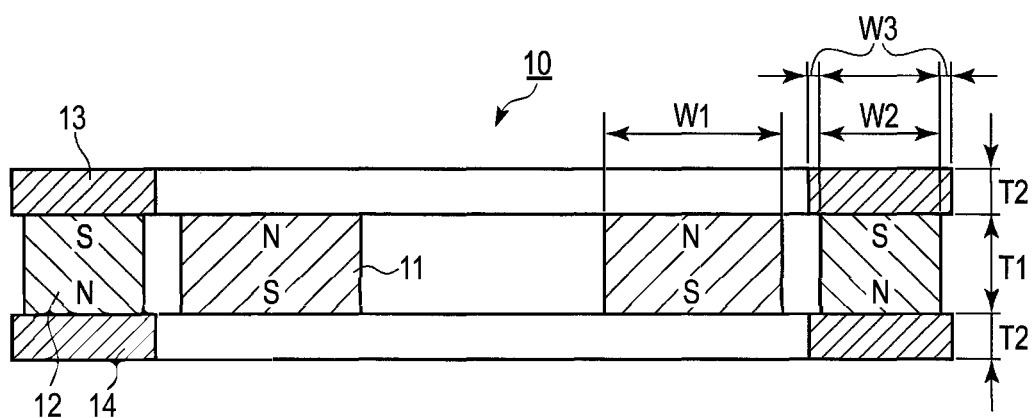
FIG. 2 is a cross-sectional view taken along line II-II shown in FIG.

FIGS. 1 and 2 show a magnetic bearing 10 according to the first embodiment.

In the magnetic bearing 10, a ring-shaped first magnet 11 and a ring-shaped second magnet 12 are concentrically arranged. That is, the second magnet 12 is arranged on the outside of the first magnet 11 and is spaced a predetermined distance from the first magnet 11. As will be described later, the first magnet 11 is provided, for example, on a shaft fixed to a motor, and the second magnet 12 is fixed to a hub 24 as a rotating member provided in a rotatable manner with respect to the shaft of the motor.

As shown in FIG. 2, the first magnet 11 is magnetized in such a manner as to have the north pole on the first surface (front surface) side and have the south pole on the second surface (rear surface) side, for example, and the second magnet 12 is magnetized in such a manner as to have the south pole on the first surface (front surface) side and have the north pole on the second surface (rear surface) side, for example. Therefore, attraction force acts between the first magnet 11 and the second magnet 12.

A ring-shaped first yoke 13 is provided on the first surface of the second magnet 12, and a ring-shaped second yoke 14 is provided on the second surface of the second magnet 12.

Figure 3:
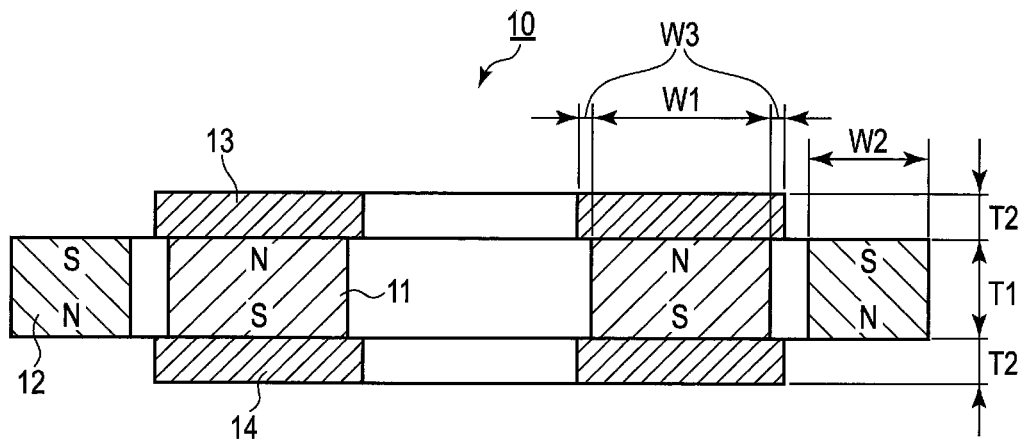
FIG. 3 is a cross-sectional view showing a modification example of the first embodiment.

However, the present invention is not limited to this example, and as is the case with a modification example shown in FIG. 3, the first yoke 13 may be provided on the first surface of the first magnet 11 and the second yoke 14 may be provided on the second surface of the first magnet 11.

The first yoke 13 and the second yoke 14 are formed of, for example, a magnetic material such as Fe—Si or Fe—Co.

In the case of FIG. 2, the width of each of the first yoke 13 and the second yoke 14 is greater than a width W2 of the second magnet 12 by a width W3 on both sides.

In addition, in the case of FIG. 3, the width of each of the first yoke 13 and the second yoke 14 is greater than a width W1 of the first magnet 11 by the width W3 on both sides.

As shown in FIG. 2, in a state where the first yoke 13 and the second yoke 14 are mounted on the second magnet 12 and the magnetic centers of the first yoke 13 and the second yoke 14 and the magnetic center of the second magnet 12 are matched, a gap is formed between the first yoke 13 and the first magnet 11 and between the second yoke 14 and the first magnet 11.

As shown in FIG. 3, in a state where the first yoke 13 and the second yoke 14 are mounted on the first magnet 11 and the magnetic centers of the first yoke 13 and the second yoke 14 and the magnetic center of the first magnet 1 are matched, a gap is formed between the first yoke 13 and the second magnet 12 and between the second yoke 14 and the second magnet 12.

In the first embodiment, a thickness T1 of the first magnet 11 and a thickness T1 of the second magnet 12 are equal, and a thickness T2 of the first yoke 13 and a thickness T2 of the second yoke 14 are equal.

The thickness T2 of each of the first yoke 13 and the second yoke 14 is set as follows.

Figure 4:
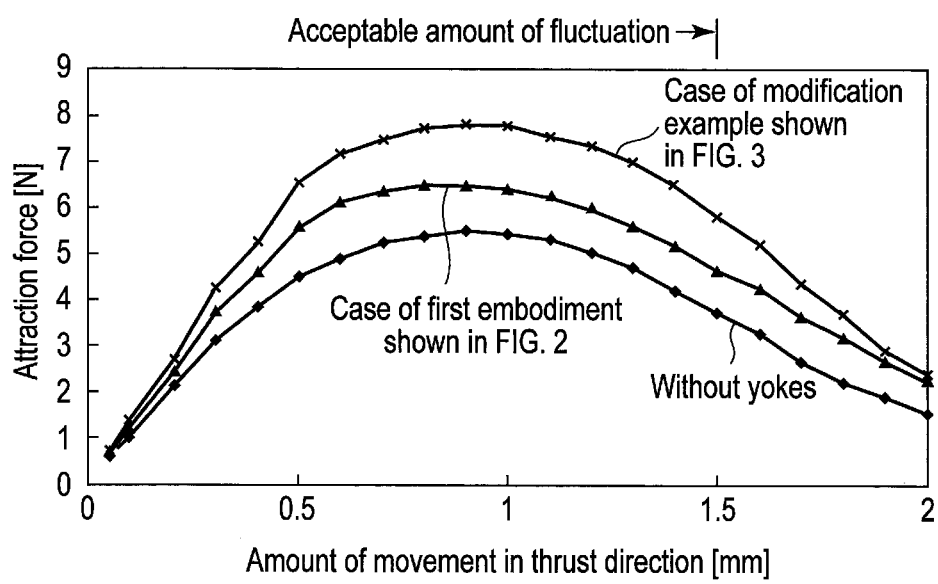
FIG. 4 is an explanatory diagram showing an acceptable fluctuation amount of the magnetic bearing.

FIG. 4 shows the relationship between the fluctuation amount in the thrust direction and the attraction force of the first magnet 11 and the second magnet 12, and shows the case of the configuration of the first embodiment shown in FIG. 2, the case of the configuration of a modification example of the first embodiment shown in FIG. 3, and a case where the yokes are removed from the configurations shown in FIGS. 2 and 3.

In FIG. 4, the attraction force in the configuration shown in FIG. 3 is greater than the attraction force in the configuration shown in FIG. 2. The reason is because the width W1 of the first magnet 11 on which the first yoke 13 is provided is greater than the width W2 of the second magnet 12 and the magnetic force of the first magnet 11 is greater than the magnetic force of the second magnet 12.

As is evident from FIG. 4, the attraction force of the first magnet 11 and the second magnet 12 becomes maximum when the fluctuation amount in the thrust direction is about 1 mm. In the case of each of the configuration shown in FIG. 2 and the configuration shown in FIG. 3, the attraction force substantially the same as the maximum attraction force of the case without the yokes can be obtained until the fluctuation amount is about 1.5 mm. If the acceptable fluctuation amount of the first magnet 11 and the second magnet 12 is set to be less than or equal to 1.5 mm, the thickness T2 of each of the first yoke 13 and the second yoke 14 is in a range of less than or equal to the acceptable fluctuation amount in the thrust direction and greater than or equal to 0.1 mm.

More specifically, the thickness T2 of each of the first yoke 13 and the second yoke 14 is set in a range of greater than or equal to 0.1 mm and less than or equal to 1.5 mm, and considering the thickness of the entire magnetic bearing 10 and the necessary attraction force, the thickness T2 of each of the first yoke 13 and the second yoke 14 is preferably in a range of greater than or equal to 0.5 mm and less than or equal to 1.0 mm and is more preferably about 0.5 mm.

The thickness T2 of each of the first yoke 13 and the second yoke 14 should not be less than 0.1 mm because magnetic saturation occurs when the thickness T2 of each of the first yoke 13 and the second yoke 14 is less than 0.1 mm.

Figure 5:
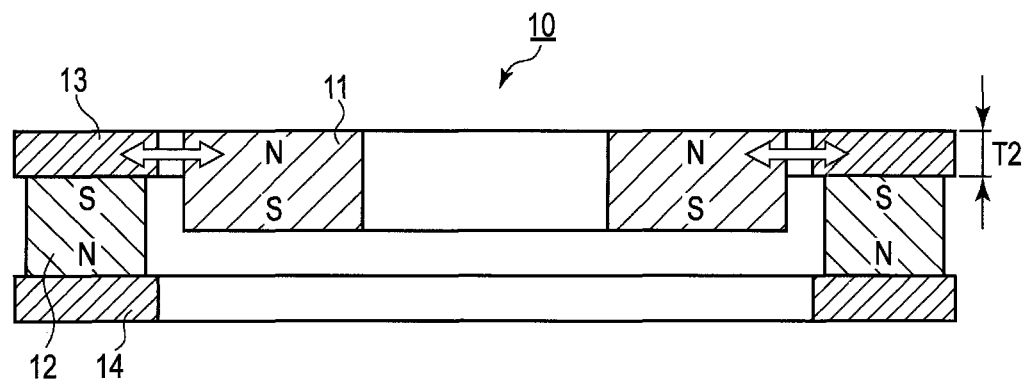
FIG. 5 is an explanatory diagram showing an effect of FIG. 2.
Figure 6:
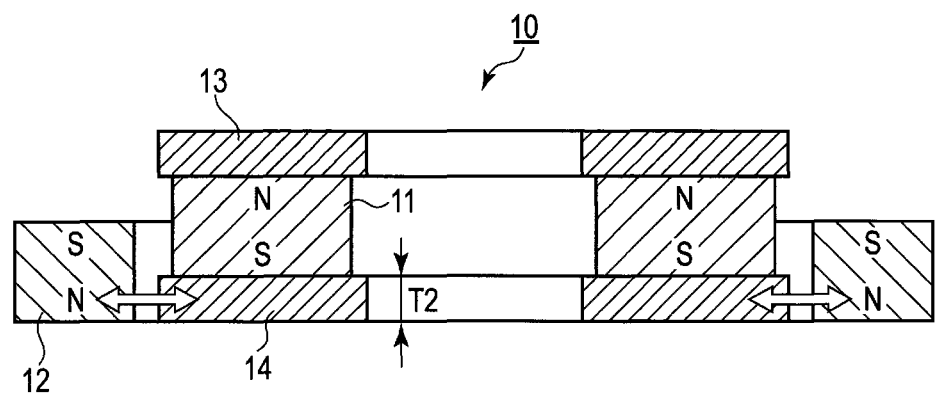
FIG. 6 is an explanatory diagram showing an effect of FIG. 3.

FIGS. 5 and 6 show a case where the second magnet 12 fluctuates to the maximum in the thrust direction with respect to the first magnet 11.

As shown in FIG. 5, since the first yoke 13 has the thickness T2 of less than or equal to the acceptable fluctuation amount in the thrust direction and greater than or equal to 0.1 mm, even when the second magnet 12 fluctuates to the maximum in the thrust direction with respect to the first magnet 11, the first yoke 13 can still be positioned on the side of the first magnet 11. Therefore, magnetic force is concentrated between the first yoke 13 and the first magnet 11 and sufficient attraction force can be obtained.

In addition, as shown in FIG. 6, since the second yoke 14 has the thickness T2 less than or equal to the acceptable fluctuation amount in the thrust direction and greater than or equal to 0.1 mm, even when the second magnet 14 fluctuates to the maximum in the thrust direction with respect to the first magnet 11, the second yoke 14 can still be positioned on the side of the second magnet 12. Therefore, magnetic force is concentrated between the second yoke 14 and the second magnet 12 and sufficient attraction force can be obtained.

(Advantageous Effects of First Embodiment)

According to the above-described first embodiment, the first magnet 11 and the second magnet 12 are concentrically arranged, one of the first magnet 11 and the second magnet 12 has the first yoke 13 and the second yoke 14, and each of the first yoke 13 and the second yoke 14 has the thickness T2 which is substantially the same as the acceptable fluctuation amount of the first magnet 11 and the second magnet 12. Therefore, even when the second magnet 12 fluctuates with respect to the first magnet 11, sufficient attraction force can be obtained, and the fluctuation of the second magnet 12 with respect to the first magnet 11 can be suppressed.

In addition, the first yoke 13 and the second yoke 14 are provided on one of the first magnet 11 and the second magnet 12. Therefore, the number of yokes can be reduced as compared to a case where the first yoke 13 and the second yoke 14 are provided on each of the first magnet 11 and the second magnet 12, and at the time of assembly, the magnetic centers of the first yoke 13 and the second yoke 14 and the magnet center of the first magnet 11 or the second magnet 12 can be easily matched. Consequently, the assembly work can be simplified.

Furthermore, since the first yoke 13 and the second yoke 14 are provided on one of the first magnet 11 and the second magnet 12, the force in the radial direction of the entire bearing can be reduced. Therefore, deviation in the radial direction of the magnetic centers of the first yoke 13 and the second yoke 14 can be prevented, and contact of, for example, the components of the motor in which the magnetic bearing 10 is provided can be prevented. Consequently, the life of the motor can be extended.

Second Embodiment

Figure 7:
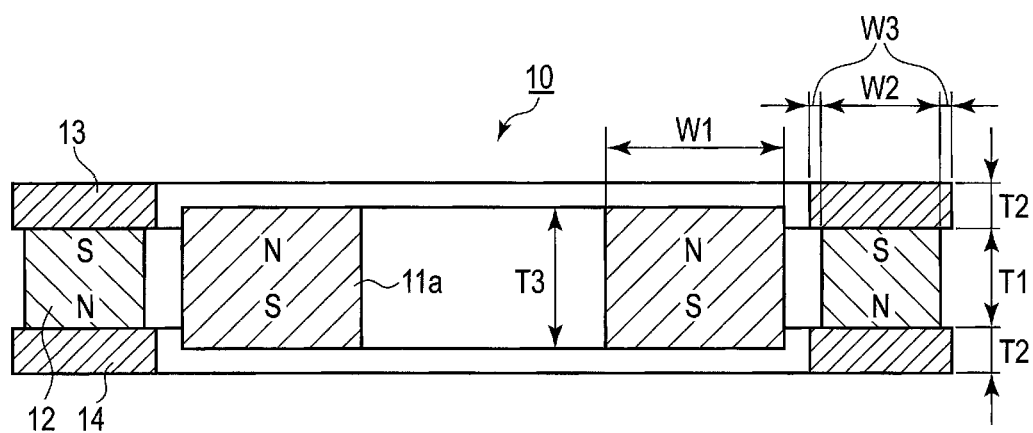
FIG. 7 is a cross-sectional view showing an example of a magnetic bearing according to the second embodiment.
Figure 8:
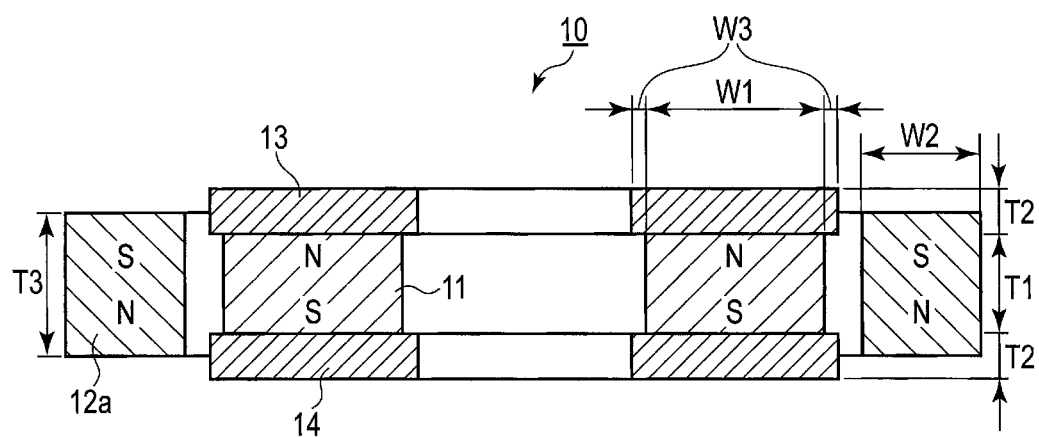
FIG. 8 is a cross-sectional view showing a modification example of the second embodiment.

FIGS. 7 and 8 show an example of a magnetic bearing according to the second embodiment.

In the first embodiment, the thickness of the first magnet 11 and the thickness of the second magnet 12 are equal. In the second embodiment, on the other hand, the thickness of the first magnet 11 (11a) and the thickness of the second magnet 12 (12a) are different from each other.

In FIG. 7, the first yoke 13 and the second yoke 14 are provided on the second magnet 12. A thickness T3 of the first magnet 11a is greater than the thickness T1 of the second magnet 12 and less than the total thickness of the thickness T1 of the second magnet 12, the thickness T2 of the first yoke 13 and the thickness T2 of the second yoke 14.

In FIG. 8, the first yoke 13 and the second yoke 14 are provided on the first magnet 11. A thickness T3 of the second magnet 12a is greater than the thickness T1 of the first magnet 11 and less than the total thickness of the thickness T1 of the first magnet 11, the thickness T2 of the first yoke 13 and the thickness T2 of the second yoke 14.

Figure 9:
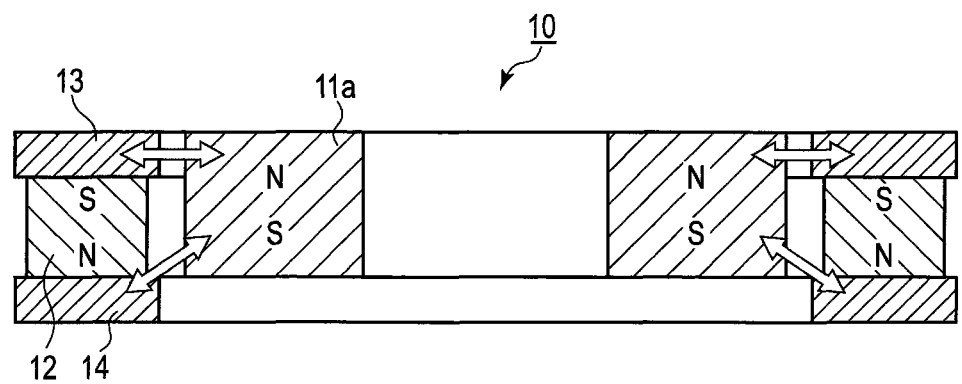
FIG. 9 is an explanatory diagram showing an effect of FIG. 7.
Figure 10:
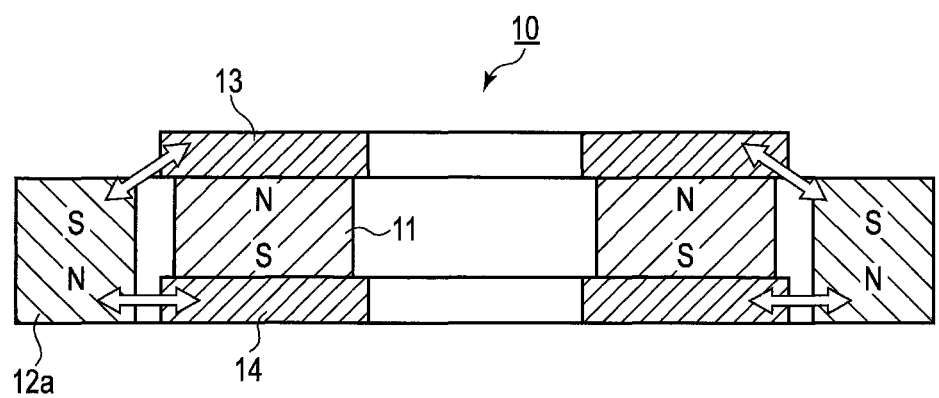
FIG. 10 is an explanatory diagram showing an effect of FIG. 8.

FIGS. 9 and 10 show a case where the second magnet 12 fluctuates to the maximum in the thrust direction with respect to the first magnet 11.

As shown in FIG. 9, the first magnet 11a has the thickness T3 which is greater than the thickness T1 of the second magnet 12 and less than the total thickness of the thickness T1 of the second magnet 12, the thickness T2 of the first yoke 13 and the thickness T2 of the second yoke 14. Therefore, even when the second magnet 12 fluctuates to the maximum in the thrust direction with respect to the first magnet 11a, the first yoke 13 can still be positioned on the side of the first magnet 11a. Consequently, magnetic force is concentrated between the first yoke 13 and the first magnet 11a and sufficient attraction force can be obtained.

In addition, as shown in FIG. 10, the second magnet 12a has the thickness T3 which is greater than the thickness T1 of the first magnet 11 and less than the total thickness of the thickness T1 of the first magnet 11, the thickness T2 of the first yoke 13 and the thickness T2 of the second yoke 14. Therefore, even when the second magnet 12a fluctuates to the maximum in the thrust direction with respect to the first magnet 11, the second yoke 14 can still be positioned on the side of the second magnet 12a. Consequently, magnetic force is concentrated between the second yoke 14 and the second magnet 12a and sufficient attraction force can be obtained.

(Advantageous Effects of Second Embodiment)

Effects similar to those of the first embodiment can be obtained also by the second embodiment.

In addition, according to the second embodiment, while the diameter and thickness of the magnetic bearing 10 are set to be the same as those of the magnetic bearing 10 of the first embodiment, the thickness T3 of the first magnet 11a or the second magnet 12a can be set to be greater than the thickness T1 of the first magnet 11 or the second magnet 12 of the first embodiment. Therefore, the attraction force in the thrust direction can be increased, and the performance of the magnet bearing can be improved.

Application Example

Figure 11:
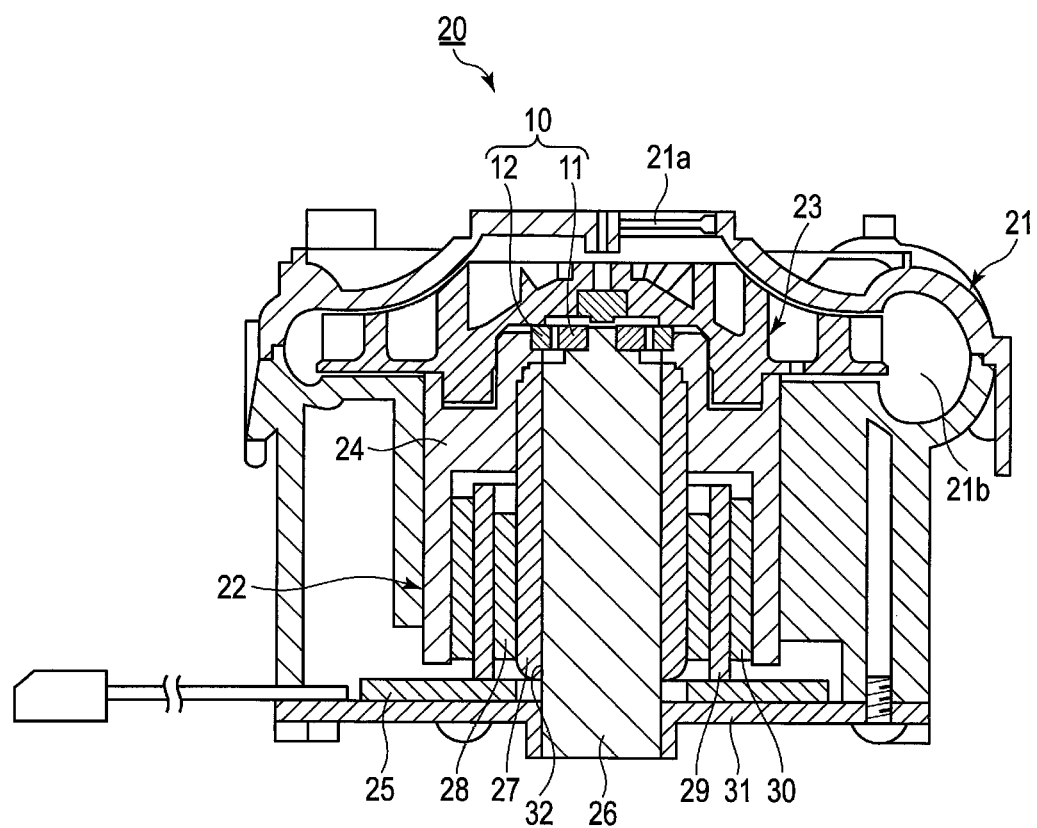
FIG. 11 is a cross-sectional view showing an example of a centrifugal fan to which the embodiments are applied.

FIG. 11 is an example of a fan motor 20 adopting the magnetic bearing 10 of the first embodiment and the second embodiment. For example, a turbo fan as a centrifugal fan is used for the fan motor 20.

The fan motor 20 comprises a case body 21, a motor 22 and a turbo fan 23. The motor 22 is provided in the bottom portion inside the case body 21, and the turbo fan 23 is provided in a hub 24 as a rotating member of the motor 22 inside the case body 21.

The case body 21 has an air suction port 21a in its upper central portion and an air discharge port 21b in its peripheral portion.

The motor 22 comprises a substrate 25, a shaft 26, a sleeve 27, a back yoke 28, a coreless continuous waveform coil 29, a rotor 30, a base plate 31, and a hub 24 as a rotating member.

The shaft 26 has, for example, a cylindrical shape and is fixed to the base plate 31 in such a manner as to project upward from the substrate 25. A plurality of V-shaped grooves (not shown) called herringbone grooves are provided around the shaft 26. Since these grooves are provided, as the sleeve 27 is rotated, dynamic pressure is produced by air as fluid.

The sleeve 27 has a cylindrical shape and is arranged in the outer peripheral portion of the shaft 26 with a minute gap 32 in between.

The back yoke 28 is attached to the outer peripheral portion of the sleeve 27.

The coreless coil 29 is located in the outer peripheral portion of the back yoke 28 and is attached to the substrate 25. The coreless coil 29 is made of, for example, a wire wound continuously in a waveform.

The rotor 30 is arranged in the outer peripheral portion of the coreless coil 29 and has a permanent magnet (not shown).

The hub 24 as a rotating member holds the sleeve 27, the back yoke 28 and the rotor 30, and covers the upper portion of the shaft 26 and the outer peripheral portion of the rotor 30.

The magnetic bearing 10 according to the first embodiment and the second embodiment is provided between the upper portion of the shaft 26 and the hub 24. The first magnet 11 of the magnetic bearing 10 is fixed to the upper portion of the shaft 26, and the second magnet 12 is fixed to the upper portion of the hub 24. The first yoke 13 and the second yoke 14 are not illustrated in FIG. 11.

In the above-described configuration, when the motor 22 is driven, dynamic pressure is produced by air which is produced around the shaft 26 as the sleeve 27 is rotated, and force in the thrust direction is produced in the second magnet 12 with respect to the first magnet 11. Even when the second magnet 12 fluctuates with respect to the first magnet 11 due to the force in the thrust direction, since the thickness of each of the first yoke 13 and the second yoke 14 is set to be less than or equal to the acceptable fluctuation amount of the second magnet 12 with respect to the first magnet 11 and greater than or equal to 0.1 mm, the fluctuation can be suppressed by the attraction force of the first magnet 11 and the second magnet 12.

In addition, since the first yoke 13 and the second yoke 14 are provided on one of the first magnet 11 and the second magnet 12, the force in the radial direction of the entire bearing can be reduced. Therefore, deviation of the magnetic centers in the radial direction can be prevented, contact between the shaft 26 of the motor 22 and the sleeve 27 can be prevented, and the life of the motor 20 can be extended.

Figure 12:
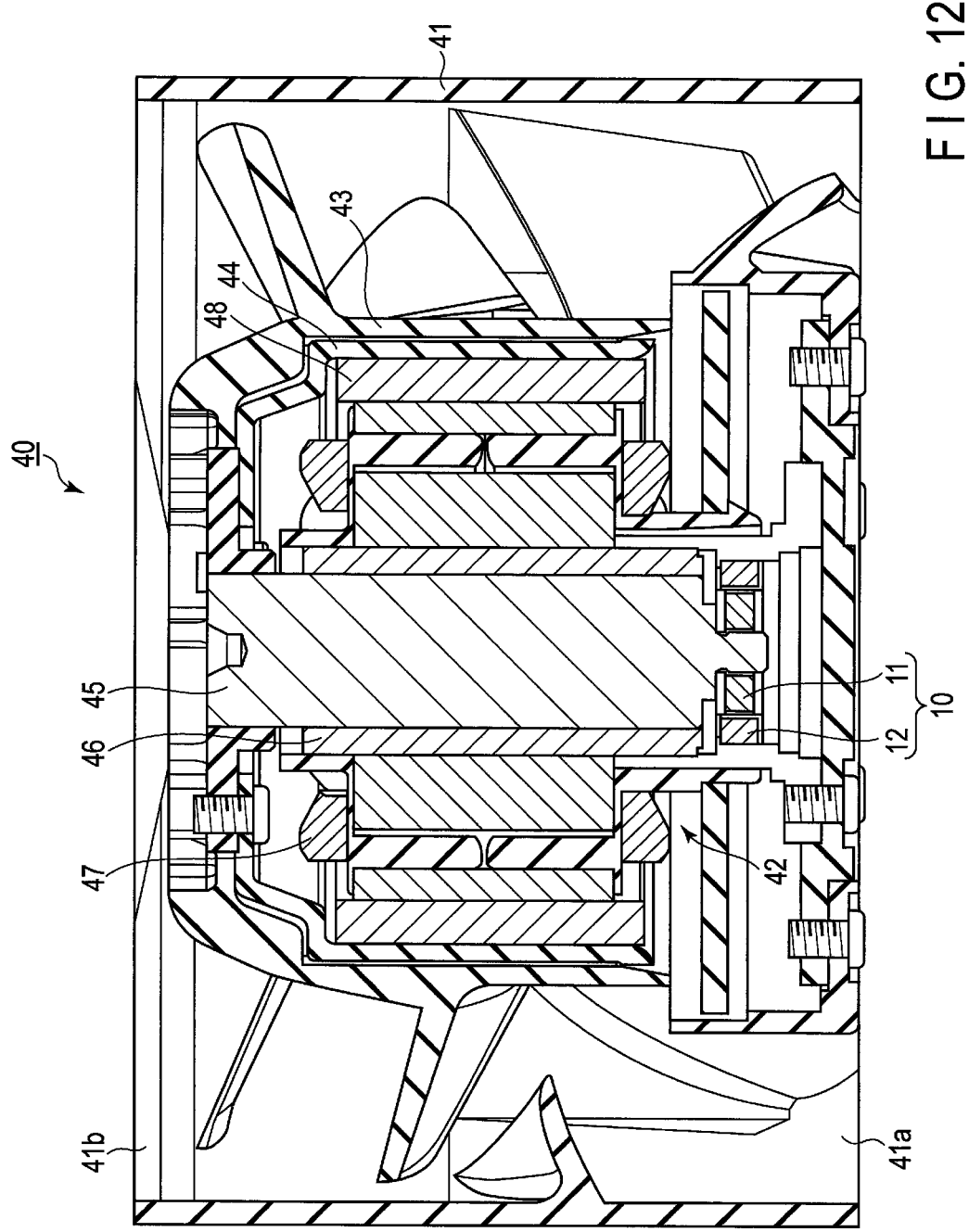
FIG. 12 is a cross-sectional view showing an example of an axial fan to which the embodiments are applied.

FIG. 12 shows a case where the magnetic bearing 10 of the first embodiment and the second embodiment is applied to, for example, a fan motor 40 comprising an axial fan.

For example, a turbo fan as an axial fan is used for the fan motor 40.

The fan motor 40 comprises a case body 41, a motor 42 and a turbo fan 43. The motor 42 is provided in the bottom portion inside the case body 41, and the fan 43 is provided in a hub 42 as a rotating member of the motor 42 inside the case body 41.

The case body 41 has an air suction port 41a and an air discharge port 41b.

The motor 42 comprises a hub 44, a shaft 45, a sleeve 46, a coil 47, a magnet 48, and the magnetic bearing 10 according to the first embodiment and the second embodiment.

The first magnet 11 of the magnetic bearing 10 is provided in the shaft 45 of the motor 42, and the second magnet 12 of the magnetic bearing 10 is fixed to the case body 41. Therefore, the shaft 45 is rotatably held by the magnetic bearing 10. The first yoke 13 and the second yoke 14 are not illustrated in FIG. 12.

The hub 44 is attached to the shaft 45, the magnet 48 is provided on the inner side of the hub 44, and the fan 43 is provided on the outer side of the hub 44.

The sleeve 46 and the coil 47 are fixed to the case body 41.

A plurality of V-shaped grooves (not shown) called herringbone grooves are provided around the shaft 45. Since these grooves are provided, as the shaft 45 is rotated, dynamic pressure is produced by air as fluid.

Effects similar to those of the fan motor 20 shown in FIG. 11 can be obtained also by the fan motor 40 of the above-described configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic bearing comprising:
   a ring-shaped first magnet magnetized in an axial direction;
   a ring-shaped second magnet arranged concentrically with the first magnet and magnetized in the axial direction;
   a first magnetic body provided only on the second magnet and provided on a first surface in the axial direction of the second magnet; and
   a second magnetic body provided only on the second magnet and provided on a second surface parallel to the first surface in the axial direction of the second magnet, wherein
   a thickness of each of the first magnetic body and the second magnetic body is less than or equal to a maximum fluctuation amount in the axial direction of the second magnet with respect to the first magnet and greater than or equal to 0.1 mm.

2. The magnetic bearing of claim 1, wherein the thickness of each of the first magnetic body and the second magnetic body is in a range of greater than or equal to 0.1 mm and less than or equal to 1.5 mm.

3. The magnetic bearing of claim 1, wherein a thickness of the first magnet is equal to a thickness of the second magnet.

4. The magnetic bearing of claim 1, wherein a thickness of the first magnet is greater than a thickness of the second magnet and less than a total thickness of the second magnet, the first magnetic body and the second magnetic body.

5. The magnetic bearing of claim 1, wherein the maximum fluctuation amount is less than or equal to 1.5 mm.

6. A magnetic bearing comprising:
   a ring-shaped first magnet magnetized in an axial direction;
   a ring-shaped second magnet arranged concentrically with the first magnet and magnetized in the axial direction;
   a first magnetic body provided only on one of the first and second magnets, and provided on a first surface in the axial direction thereof; and
   a second magnetic body provided only on one of the first and second magnet on which the first magnetic body is provided, and provided on a second surface parallel to the first surface in the axial direction thereof, wherein
   a thickness of each of the first magnetic body and the second magnetic body is less than or equal to a fluctuation amount in a thrust direction obtained by an attraction force of the first magnet and the second magnet that is substantially the same as a maximum attraction force associated with a case not including the first and second magnetic bodies, and wherein the thickness is greater than or equal to 0.1 mm.

7. The magnetic bearing of claim 6, wherein the thickness of each of the first magnetic body and the second magnetic body is in a range of greater than or equal to 0.1 mm and less than or equal to 1.5 mm.

8. The magnetic bearing of claim 6, wherein a thickness of the first magnet is equal to a thickness of the second magnet.

9. The magnetic bearing of claim 6, wherein a thickness of the first magnet is greater than a thickness of the second magnet and less than a total thickness of the second magnet, the first magnetic body and the second magnetic body.

10. A magnetic bearing comprising:
    a ring-shaped first magnet magnetized in an axial direction;
    a ring-shaped second magnet arranged concentrically with the first magnet and magnetized in the axial direction;
    a first magnetic body provided only on one of the first and second magnets, and provided on a first surface in the axial direction thereof; and
    a second magnetic body provided only on one of the first and second magnet on which the first magnetic body is provided, and provided on a second surface parallel to the first surface in the axial direction thereof, wherein
    a thickness of each of the first magnetic body and the second magnetic body is less than or equal to 1.5 mm and greater than or equal to 0.1 mm.

11. The magnetic bearing of claim 10, wherein a thickness of the first magnet is equal to a thickness of the second magnet.

12. The magnetic bearing of claim 10, wherein a thickness of the first magnet is greater than a thickness of the second magnet and less than a total thickness of the second magnet, the first magnetic body and the second magnetic body.

* * * * *